Dec. 24, 1968 C. A. LAUTER, JR 3,418,602

DIRECT-COUPLED REGENERATIVE FEEDBACK STARTING CIRCUIT FOR COMMON-EMITTER POWER OSCILLATORS

Filed May 25, 1967 2 Sheets-Sheet 1

INVENTOR

CHARLES A. LAUTER, JR.

BY

ATTORNEY

Dec. 24, 1968 C. A. LAUTER, JR 3,418,602

DIRECT-COUPLED REGENERATIVE FEEDBACK STARTING CIRCUIT FOR COMMON-EMITTER POWER OSCILLATORS

Filed May 25, 1967

2 Sheets-Sheet 2

INVENTOR
CHARLES A. LAUTER, JR.

BY [signature]

ATTORNEY

United States Patent Office 3,418,602

Patented Dec. 24, 1968

3,418,602

DIRECT-COUPLED REGENERATIVE FEEDBACK STARTING CIRCUIT FOR COMMON-EMITTER POWER OSCILLATORS

Charles A. Lauter, Jr., Oxon Hill, Md., assignor to the United States of America as represented by the Secretary of the Navy Filed May 25, 1967, Ser. No. 642,668
6 Claims. (Cl. 331—113)

ABSTRACT OF THE DISCLOSURE

A starting circuit for a transistor inverter using direct coupled feedback to start the oscillations and transformer feedback to maintain the oscillations once started. A unidirectional current device in the transformer feedback circuit prevents the waste of starting power in the circuit. The direct coupled feedback provides for reliable starting in a more efficient manner at low temperatures and at low voltages relative to the normal operating voltage of the oscillator.

*Background of the invention*

The present invention relates to starting circuits and more particularly to starting circuits for common-emitter power oscillators which provide reliable starting in a more efficient manner at low temperatures and at low voltages relative to the normal operating voltage of the oscillators.

Those concerned with the development of power oscillator starting circuits have long recognized the need for such a starting circuit. The present invention fulfills this need.

*Summary of the invention*

The general purpose of this invention is to provide a power oscillator starting circuit which embraces all the advantages of similarly employed starting circuits and possesses none of the inherent disadvantages present in the prior art starting circuits. To attain this the present invention contemplates a feedback circuit arrangement in the transistor circuit whereby a positive direct coupled feedback loop is coupled to each transistor so as to enable the transistors in the oscillator to amplify their own unbalance and any noise present which will aid the starting of the oscillator circuit.

An object of the present invention is the provision of a power oscillator starting circuit which is efficient and effective at low temperatures and at low voltages relative to the normal operating voltage of the oscillator.

Another object is to provide such a starting circuit which has resistors that form a positive direct coupled feedback loop to each transistor within the power oscillator.

*Description of the preferred embodiments*

Figure 1:
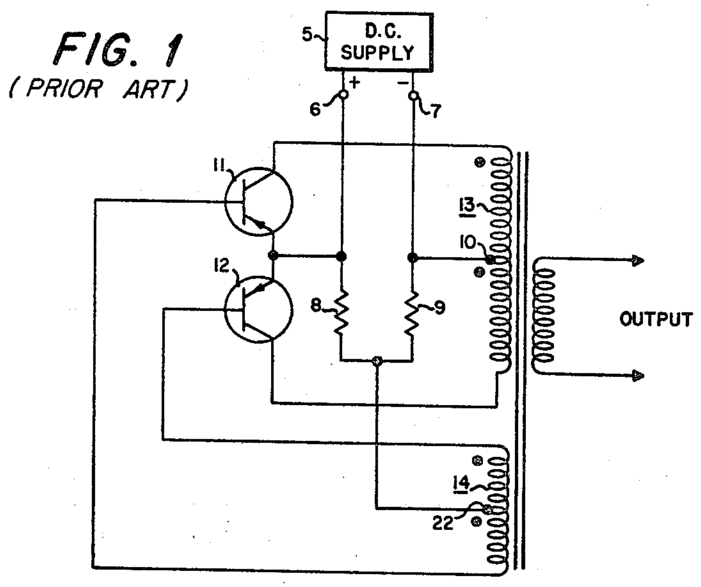
FIG. 1 (PRIOR ART)
FIG. 1 shows in schematic a common-emitter power oscillator having a resistive voltage-divider type starting circuit, which is known in the art.

Referring now to the drawings, wherein like reference characters designate like or corresponding parts throughout the several views, there is shown in FIG. 1, which illustrates one of the most well known starting circuits in combination with a common-emitter type transistor power oscillator, a pair of input terminals 6 and 7, which are coupled to a direct current power supply 5. Current flowing from this power supply passes through resistors 8 and 9 so as to cause a voltage to be developed across resistor 8. This voltage across resistor 8 causes a small amount of forward bias current to flow in the transistors 11 and 12, and because of the physical differences in the transistors and because of the presence of circuit noise, the power oscillator will start.

The resistor 8 must be low in value due to the fact that all of the drive currents to the bases of the transistors 11 and 12, which drive currents are induced in the drive winding 14 by the changes in flux created by the variations in current flow through primary winding 13. must flow through resistor 8 when the power oscillator is in an oscillating condition. Therefore, in order to develop enough voltage across resistor 8 to start the oscillator, a relatively large current must be made to flow through resistor 8 from terminals 6 and 7 and the power supply 5 coupled thereto. Necessarily, this same current must also flow through resistor 9. Because the resistor 8 is small in value, most of the supply voltage will be across resistor 9. Additionally, as the temperature is lowered the voltage required for starting the power oscillator increases due to the decreasing gain of the transistors with the lowered temperature. This means that a greater current must flow through resistor 8, which in turn means that resistor 9 must dissipate more power than was dissipated prior to the increase in current flow.

In addition to the power dissipated by resistor 9 during starting of the power oscillator, it can be seen that current continues to flow from the power supply 5 and terminals 6 and 7 through resistors 8 and 9 even after the oscillator has been started and while it is running. Thus, in the circuit of FIG. 1 input power will continue to be lost in the resistors 8 and 9 because of the current which merely flows from the terminals 6 and 7 and through the resistors 8 and 9 without flowing through transistors 11 and 12.

Tests have been conducted which show that for reliable starting of a circuit of the type shown in FIG. 1, at −60° F., and at a voltage of one-half the normal operating voltage, typically 10–15% of the total input power is required by the starting circuit, i.e., resistors 8 and 9, when the output of the power oscillator is fully loaded. Because the power lost in the starting circuit is independent of the load, an even greater percentage of the input power is lost as the load is decreased. Tests conducted on power supplies used in automatic weather stations. for example, have shown that as high as 40 to 45% of the input power may be lost in the starting circuit.

Figure 2A:
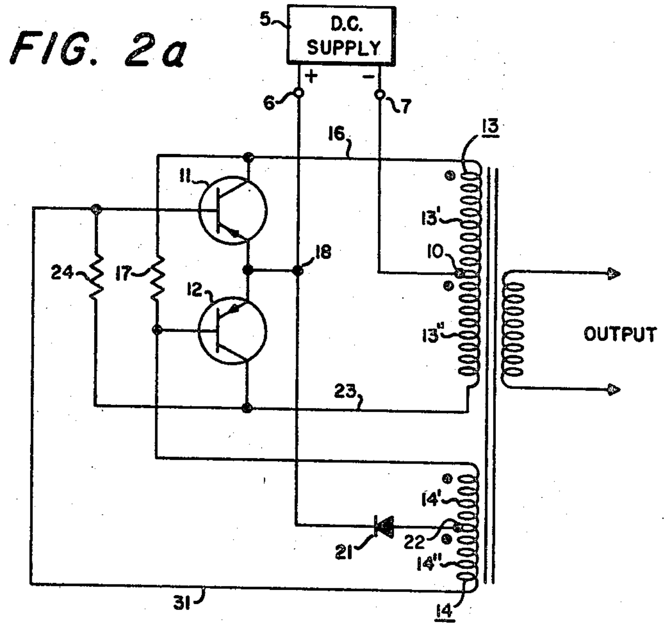
FIG. 2*a* illustrates a schematic diagram of one embodiment of the invention.

FIG. 2A illustrates one embodiment of the invention and provides for greatly increased reliability in starting the power oscillator at low temperatures and/or at low voltages relative to the normal operating voltage of the oscillator.

In order to strat the power oscillator having the starting circuit of this invention integral therewith, the DC power supply 5 provides starting currents, one portion of which flows, for example, from terminal 7 through center tap 10, through one-half of the primary winding 13 which is marked 13′, through line 16, resistor 17, through the base and emitter of transistor 12 to point 18, and back to terminal 6. Because of diode 21 this entire starting current must flow through the base and emitter of transistor 12 since the diode 21 is placed in the circuit so that current flowing through resistor 17 sees the diode 21 as an open circuit and so is forced to pass through the base and emitter of transistor 12.

At the same time a second starting current also flows from the power supply 5 and from terminal 7 through one-half of the primary winding 13 indicated as 13″.

From here, the current passes through line 23, resistor 24, through the base and emitter of transistor 11 to point 18 and back to terminal 6. Here again, the diode 21 acts as an open circuit to current passing through resistor 24 so that the entire amount of this starting current is forced to pass through the base and emitter of transistor 11.

Thus, all of the starting current from the terminals 6 and 7 passes through one or the other of transistors 11 and 12, and because transistors 11 and 12 are not perfectly matched, e.g., transistor 11, may have a greater tendency to be turned to an on condition because it may have a slightly greater gain than that of transistor 12. When transistor 11 is turned on by its starting current, which flows through resistor 24 and through the base and emitter of transistor 11, a current will then flow from terminal 7 through primary winding 13′, line 16, through the collector and emitter of transistor 11 to point 18 and to terminal 6. Although transistor 11 has a tendency to be turned on to a greater extent than trransistor 12, nevertheless the transistor 12 is also turned slightly on by the starting current flowing through resistor 17 and the base-emitter of transistor 12. Current thus flows from terminals 7 through primary winding 13″, line 23, through the collector and emitter of transistor 12 to point 18 and terminal 6.

Because the transistor 11 is turned on to a greater extent than transistor 12, transistor 11 will have a lower collector-to-emitter voltage, thus decreasing the starting current which was previously flowing through resistor 17 and into the base of transistor 12. Because the starting current for transistor 12 is reduced, the collector voltage of transistor 12 will be higher which in turn increases the starting current through resistor 24 to the base of transistor 11. This action continues until enough voltage is induced in drive winding 14 to permit the oscillator to start operating in the normal manner. It is the direct-coupled regenerative feedback which greatly increases the starting ability of the oscillator so that the slightest conduction by one of the transistors is greatly increased and in a rapid manner. This positive regenerative feedback causes the transistors to amplify their own unbalance and any noise present in the circuit and so greatly aids in the starting of the oscillator. The use of this statrting circuit and the positive regenerative feedback is so effective that tests have shown that the circuit will begin to oscillate even before there is enough voltage to cause diode 21 to conduct. This means that the circuit may begin to oscillate even before the regenerative voltages have been induced in the drive winding 14.

Figure 2B:
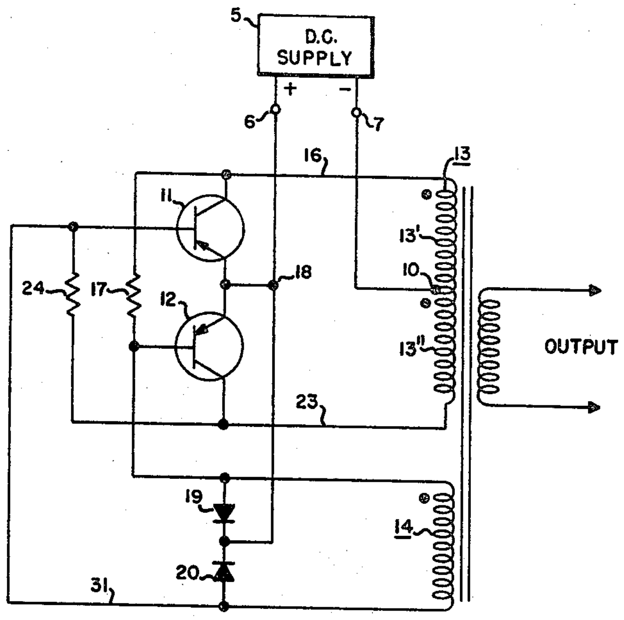
FIG. 2*b* shows in schematic diagram form a second embodiment of the invention.

FIG. 2B illustrates an alternative embodiment to that shown in FIG. 2A. By substituting diodes 19 and 20 in the circuit, as shown, in place of diode 21 in FIG. 2A the need for a center tap on the drive winding 14 is eliminated and the number of turns required for the drive winding is also reduced.

The values of the resistors 17 and 24 is dependent upon a number of factors such as type of load and feedback ratio, and the values of these resistors is best determined experimentally. An additional advantage of this new circuit is that if either of the resistors 17 and 24 should become open or increase in value, starting of the oscillator circuit will still be achieved under all but the most severe conditions. Voltage regulation, noise generation, and oscillator frequency under normal operating conditions are also not effected by this new starting circuit.

The starting circuit of this invention provides a reliable means for starting common-emitter type power oscillators and provides for starting in a more efficient manner at low temperatures and/or at low voltages relative to the normal operating voltage of the oscillator. Tests conducted on the new circuit of this invention indicate that this starting circuit requires only 3 to 7% of the power required by the use of the prior art starting circuit shown in FIG. 1. This means that only approximately .5% of the input power is required by the starting circuit when the output is fully loaded. In addition, tests also have shown that this circuit does not affect the automatic overload protection characteristics of this type of oscillator.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be secured by Letters Patent of the United States is:

1. A transistor inverter comprising:

first and second transistors, each having output, control, and common electrodes, a transformer including at least first and second windings, said first winding being connected between said control electrodes, said second winding being connected between said output electrodes;

a source of D.C. potential connected between said common electrodes and a center tap on said second winding;

uni-directional current flow means connected between said common electrodes and said first winding;

first means connected between the output electrode of said first transistor and the control electrode of said second transistor to provide direct coupled regenerative feedback to said second transistor; and second means connected between the output electrode of said second transistor and the control electrode of said first transistor to provide direct coupled regenerative feedback to said first transistor.

2. The arrangement of claim 1 wherein the first and second means are resistors cross-connected between said output electrodes and said control electrodes.

3. The arrangement of claim 1 wherein the unidirectional current flow means comprises a rectifier having a first terminal connected to the junction of said common electrode and said source of D.C. potential and a second terminal connected to a center tap on said first winding.

4. The arrangement of claim 3 wherein said rectifier is connected with a polarity to oppose the flow of current from said source of D.C. potential through said rectifier.

5. The arrangement of claim 2 wherein the uni-directional current flow means connected between said common electrodes and said first winding includes two rectifiers each one coupled between the common electrodes of the transistors and a respective end of said first winding.

6. The arrangement of claim 5 wherein the resistors are of approximately equal value.

References Cited

UNITED STATES PATENTS 2,931,991 4/1960 Schultz ---------- 331—113.1

OTHER REFERENCES

T. D. Towers, The Institution of Electrical Engineers, "Practical Design Problems," April 1960, pp. 1373 and 1379.

JOHN KOMINSKI, *Primary Examiner.*

U.S. Cl. X.R.

321—2